United States Patent [19]

Kash

[11] Patent Number: 5,684,577
[45] Date of Patent: Nov. 4, 1997

[54] SATELLITE TERMINAL WARNING SYSTEM

[75] Inventor: Sidney W. Kash, Manhattan Beach, Calif.

[73] Assignee: The United States of America as represented by the Secretary of the Air Force, Washington, D.C.

[21] Appl. No.: 788,729

[22] Filed: Apr. 18, 1977

[51] Int. Cl.$^6$ ............... G01C 21/00; G08B 21/00; G01B 11/26
[52] U.S. Cl. .............. 336/139.01; 250/203.6; 340/945; 348/117; 364/155; 364/516
[58] Field of Search .................... 358/105, 212, 358/213; 364/455, 456, 516; 340/146.3 Q, 945; 250/203 CT, 203.6; 33/268; 348/117; 356/139.01, 139.03

[56] References Cited

U.S. PATENT DOCUMENTS

| | | | |
|---|---|---|---|
| 3,120,578 | 2/1964 | Potter et al. | 250/203 CT |
| 3,290,933 | 12/1966 | Lillestrand et al. | 33/268 |
| 3,488,504 | 1/1970 | Lowen et al. | 33/268 |
| 3,794,761 | 2/1974 | Genchi et al. | 358/213 |
| 4,032,801 | 6/1977 | Fulkerson | 356/4 |

*Primary Examiner*—Stephen C. Buczinski
*Attorney, Agent, or Firm*—William G. Auton

[57] ABSTRACT

A satellite surveillance system for providing an independent warning of attacking vehicles is realized by means of a light source detecting system that identifies discrete non-stellar light sources, locates their coordinate positions and monitors their intensity changes to determine vehicle time of arrival. All discrete light sources that exceed a given intensity level within the field of view of interest are detected and recorded in a computer memory. A catalog of stellar light sources of that intensity level and greater within the field of view is recorded in a second computer memory. The data in the computer memories are correlated by a micro-processor to distinguish between stellar and non-stellar sources. In a preferred embodiment, light source detection and monitoring is accomplished by means of a Digicon tube in combination with an array of charged coupled device detector elements.

6 Claims, 3 Drawing Sheets

SATELLITE TERMINAL WARNING SYSTEM

STATEMENT OF GOVERNMENT INTEREST

The invention described herein may be manufactured and used by or for the Government for governmental purposes without the payment of any royalty thereon.

This invention relates to satellite terminal warning systems, and in particular to an optical warning system that acquires and monitors the flight of attack vehicles by detecting sunlight reflected from them.

There is an increasing potential threat to the survivability of U.S. satellites and spacecraft, especially those of significant military value. At the same time, the capabilities and utility of these space systems is continually increasing, and their value to the United States is greater every day. It is thus not surprising that there has been a substantial emphasis recently on spacecraft survivability. As a part of this activity, various systems have been devised to identify attacks on a particular satellite. Among the latter systems are a group of small, lightweight sensors designed to ride piggyback on a satellite and provide individual warning of threats to that particular vehicle. These on-board sensors include an impact sensor, a laser illumination detector, and a radar proximity detector. Each of these sensors provides threat or attack information of a specific type, but none gives adequate advanced warning of the approach of a terminally-homing interceptor vehicle. In addition to these threat-specific sensors, extensions of existing space-based surveillance sensors have the potential to provide some degree of warning of attack on high-altitude satellites. Such systems, however, are not likely to have the inherent capability to obtain trajectory information with the degree of accuracy that may be required for some of the responsive defense alternatives. There currently exists, therefore, the need for a terminal warning sensor system that would be capable of providing independent attack warning of a terminal-homing interceptor. The present invention is directed toward satisfying that need.

SUMMARY OF THE INVENTION

The satellite terminal warning system comprehended by the invention identifies approaching attack vehicles by detecting and monitoring light reflections from the vehicle surfaces. The time of arrival of an attack which is calculated from changes in light intensity is observed in measurements taken at successive time intervals. An array of charge coupled device (CCD) sensor elements receives and is responsive to all discrete light sources of a given intensity level within the surveillance field of view. The CCD sensor element outputs are digitized and read into a computer memory to provide a continuously updated record of light source locations and intensities. A permanent catalog of stellar light sources within the surveillance field of view is also recorded in the computer memory. A micro-processor compares the current light source information with the catalog of stellar light sources to differentiate between stellar light sources and potential attack vehicles.

It is a principal object of the invention to provide a new and improved satellite terminal warning system.

It is another object of the invention to provide an autonomous add-on package type warning system capable of warning individual satellites of the approach of a foreign space object.

It is another object of the invention to provide a terminal warning system that is compact, lightweight and adaptable to many satellite types.

It is another object of the invention to provide a satellite terminal warning system that gives adequate advanced warning of the approach of a terminally homing interceptor vehicle.

It is another object of the invention to provide a satellite terminal warning system having the capability to obtain interceptor vehicle trajectory information with the degree of accuracy required to implement any responsive defense alternative.

These, together with other objects, features and advantages of the invention, will become more readily apparent from the following detailed description taken in conjunction with the illustrative embodiment in the accompanying drawings.

DETAILED DESCRIPTION OF THE PREFERRED EMBODIMENT

The terminal warning system (TWS) comprehended by the invention, is an add-on package for employment on satellites. It contains visible sensors that will monitor bright objects in a large field of view about its host satellite. It will (1) warn its host of the approach of a foreign space object; (2) determine the direction of approach, and (3) estimate in advance the time at which the space object would intercept the host satellite or pass by it.

The detection and location of a potential interceptor is accomplished primarily by the procedure of comparing bright visual objects in the surveillance field of view with a memorized star catalog. The catalog memory is periodically updated in-situ to take into account slow changes in the visual stellar background with time. The observance of objects whose intensity varies rapidly because of short specular glints provides a secondary technique for detecting an interceptor.

After a potential interceptor is located, its progress is monitored by observing the gradual increase in its intensity. The time to closest approach is determined from the relative rate of change with time of the interceptor's intensity. During these measurements discrimination procedures can be applied against the specular glints.

The TWS is designed to concentrate on bright objects whose maximum visual magnitude is approximately between 4 and 8. Such objects can be easily observed by a variety of optical detectors. Furthermore, by dealing with bright objects the number of back-ground stars one has to discriminate is kept low. For example, there are less than 5000 stars in the entire sky whose magnitude is six or less. As a consequence the field of view of individual detecting elements in the TWS is relatively large and only a few hundred detectors are required to scan the large surveillance field of view.

Figure 1:
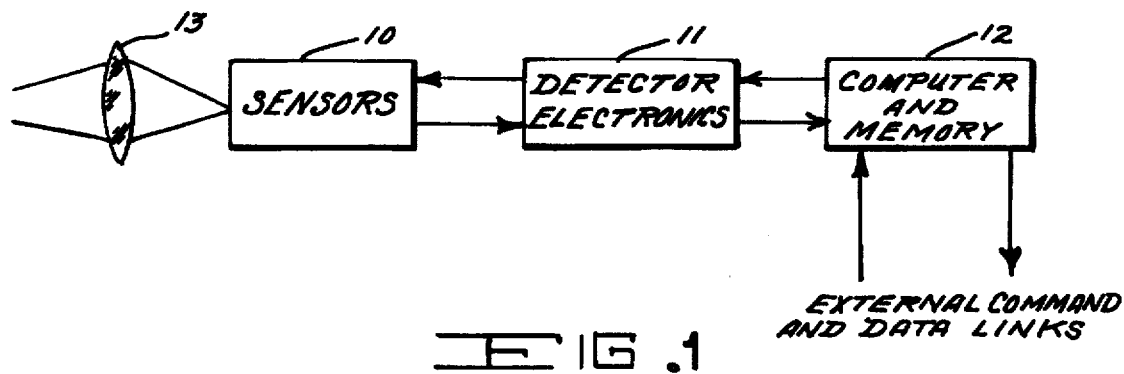
FIG. 1 is a block diagram showing the major component blocks of the terminal warning system of the invention.

The major components of the system are shown in FIG. 1 and comprise light collecting optics 13, sensors 10, detector electronics 11 and computer and memory 12.

Figure 2:
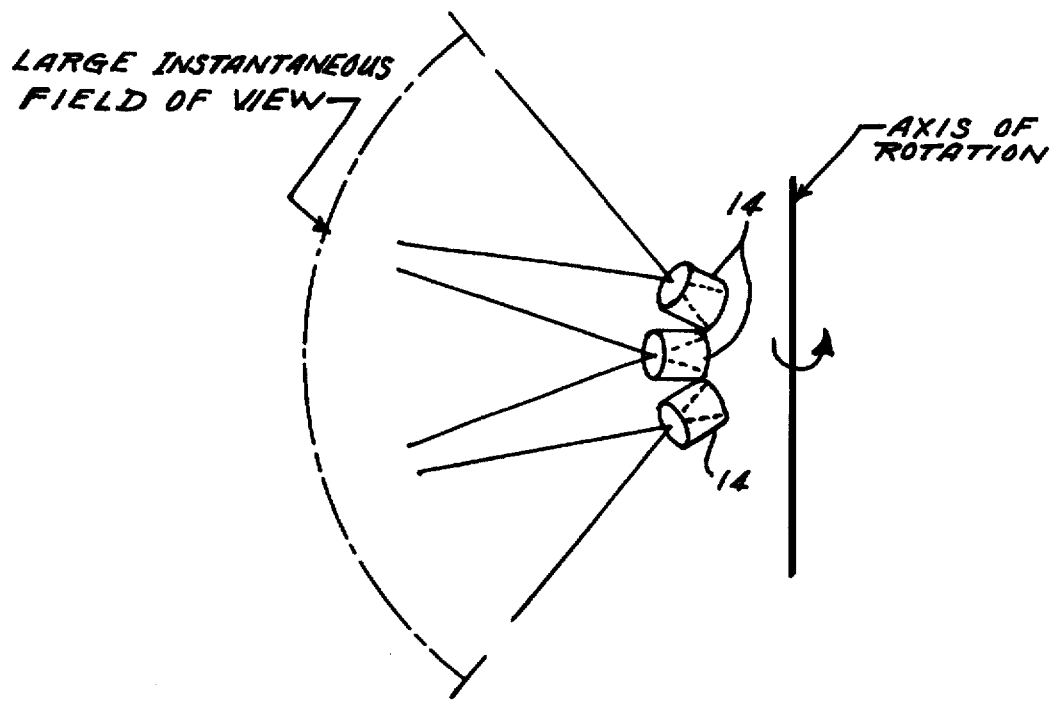
FIG. 2 is a schematic diagram of the sensor units of the invention.

The arrangement of the sensors in the TWS is shown in FIG. 2. Each sensor will cover a cone some 15 to 30 degrees wide. Several sensors 14 as shown will provide the TWS with a large sensing angle in one direction. Rotation of the set of sensors through 360° about a common axis will provide a large surveillance field of view. The specific field of view of each individual sensor and the total number of sensors will depend upon the values selected for the maximum range at which interceptor recognition is required and the minimum system sensing angle.

The entire surveillance field of view can be scanned during each 360° rotation, or it can be divided into sectors and scanned sequentially by operating the sensors one at a time during successive rotations. In an alternative TWS design, a single sensor mounted on a gimbal can be used, to provide sequential sector-scanning to cover the surveillance.

If the host satellite is spinning slowly (once around every several seconds) the sensors can be fastened rigidly to the satellite and scan the surveillance field of view as their host spins. If the host is non-spinning or spinning rapidly a rotating mirror or rotating sensor mount can be added to the TWS to provide suitable coverage of the surveillance field of view.

The terminal warning sensor described herein is intended primarily for deployment on high-altitude spacecraft, such as geostationary satellites rotating about a vertical axis. It can, however, be adapted to other rotating or non-rotating satellites. It has been determined that a region about 1000 nmi in radius about the satellite can be surveyed with a sensor package which includes the optical, detecting and data processing equipment and weighs less than forty pounds. By way of example, the host satellite is presumed to be rotating about its vertical axis at a rate of six revolutions per minute. A linear vertical array of visible-light detectors within the sensor scans the field azimuthally as the satellite rotates. The sensor surveillance field-of-view covers all directions about the satellite with the exception of a conical region around the zenith and a conical region around the nadir.

The sensor's elevation coverage is tentatively about 90°, from about 75° below to 15° above the sensor's horizon. The 90° elevation field may be scanned completely during each satellite spin or it may be divided into several sectors which are scanned sequentially. Once an intercept is acquired, the sensor scan can then be limited to a single elevation sector.

The primary method for detection involves a comparison of bright visible objects in the field of view with an on-board catalog of star position and magnitude. In practice, observations can be limited to objects and stars of visual magnitude $m \leq 8$. The catalog is continually updated in-situ as the field of view changes with the steady shift in orbit of the satellite spin axis. Star positions and intensities are entered into or removed from the catalog as the stars enter or leave the sensor field of view.

In the case of a geostationary satellite, stars near the celestial equator drift across the vertical field of view at about 15° per hour and, because of the limits on elevation coverage, remain in the catalog for about six hours. On the other hand, stars within 15° of the celestial poles will always remain within the field of view of the sensor. These stars may be re-entered into the catalog at convenient times, such as every 12 hours, when the star crosses the local meridian, corresponding to the azimuthal angles 90° and 270°. A limited number of bright stars of visual magnitude $m \leq 2$ are used to index the star field with respect to the sensor azimuth-elevation grid. A bright star, such as the Polaris near the celestial pole, can also be conveniently used to keep track of small random drifts in the attitude of the satellite spin axis.

Each sensor contains an optical telescope and an array of visual detector elements at the focal surface of the telescope. A refracting or reflecting telescope design can be used.

Any visible detector suitable to achieve the objects of the invention can be used. Three types are discussed here by way of example. They are: the discrete silicon photodiode array; the image dissector, and the Digicon tube device combined with a CCD detector array.

Each type of detector has specific advantages. The silicon photodiodes are rugged and stable, have a linear response, large dynamic range, and provide precise detector-element location. But because of their relative insensitivity, they require a large telescope to achieve a satisfactory observation range.

The image dissector or scanning photomultiplier has greater sensitivity and can provide a lighter, more compact system. However, its scanning-mode of operation yields less certain object location and a smaller signal integration time, and its linear scan makes the time-to-intercept intensity monitoring function more difficult to implement. Both the silicon detector array and the image dissector have been successfully employed in space missions.

The Digicon tube device provides the precise detector location and signal-integration time of the silicon photodiode array, and the increased sensitivity of the photomultiplier. The Digicon should provide the lightest and most compact TWS system. The Digicon also can accommodate a rectangular array of detector elements. In practicing the invention, a Digicon tube device produced by Electronic Vision Company is combined with a solid state CCD, such as produced by Fairchild Semiconductor, to provide an intensified charge coupled device (ICCD).

Figure 3:
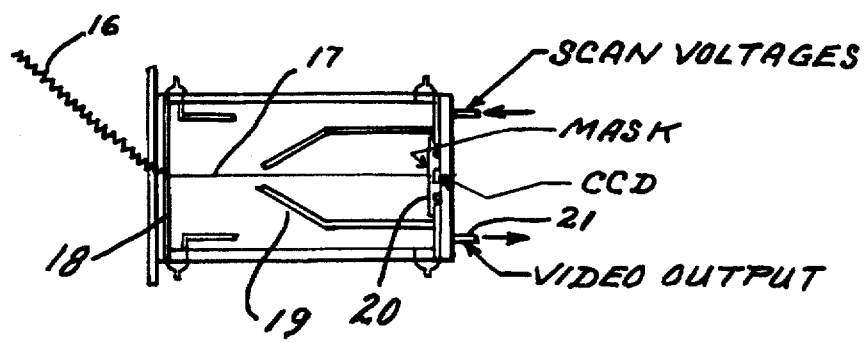
FIG. 3 is a schematic diagram of an intensified charge coupled device.

The ICCD is operated as a photon counting array detector. The basic configuration of this device is indicated in FIG. 3. An incident photon 16 is converted to a photoelectron 17 with a standard photo-cathode 18 (S-20, for example). This photoelectron is then accelerated to an energy of about 15 Kev and electrostatically focused by electrostatic focusing cone 19 onto the surface 20 of a CCD. Within a particular photosite on the CCD the photoelectron creates many hole-electron pairs by ionization. These charges from the single photoelectron are collected and produce an easily detectable charge packet. These charge packets are "scanned" from the CCD by the conventional clock pulse trains. After on-chip amplification, the signals leave on a single video output line 21. These data are then electronically processed to detect the charge packet produced by each photoelectron. The information is then processed on-line, and stored in a special memory which can operate at video data rates.

An interline CCD (Fairchild) will be bombarded by electrons arriving from the photocathode. The transfer registers, which carry the charge from the photosensitive sites to the on-chip preamplifier, operate independently and at the same time as the integration of charge at the photo sites. Thus the transfers or "scanning" can take place during the integration period, and the array is sensitive essentially all the time. These transfer registers are protected by a layer of aluminum, so that the bombarding electrons cannot produce any ionization or "noise" in the registers. In the operational data system, the scanning procedure is controlled by an external device (the circulating semiconductor memory (CSM)) which may be programmed to scan a portion of the 100×100 array, or the entire array.

As indicated above, the TWS will carry out two basic functions: (1) detection and location of a potential intercept, and (2) determination of the time to intercept or time of closest approach. Each function may be carried out by different sets of detecting elements in the detector array (see FIG. 4). The first function is accomplished with a linear array of detectors $D_1$ parallel to the TWS spin axis. (Two or three linear sets of detectors may be used to provide greater reliability of detection and to reduce the false alarm rate of the TWS.) As the TWS rotates, the $D_1$ detectors scan the entire surveillance field of view and the bright objects observed are compared with the stellar catalog in the memory. A new object or a difference in intensity or position indicates a potential interceptor. In addition, the location of one or more bright stars during each scan can be used to determine the sensor attitude. The $D_1$ detectors are also used periodically to update the stellar catalog. A few additional detectors may be added at the end of the $D_1$ array to facilitate the cataloging procedure. A second set of detectors $D_2$ (parallel to $D_1$) sensitive to rapid intensity fluctuations provides a backup detection and location procedure.

Figure 4:
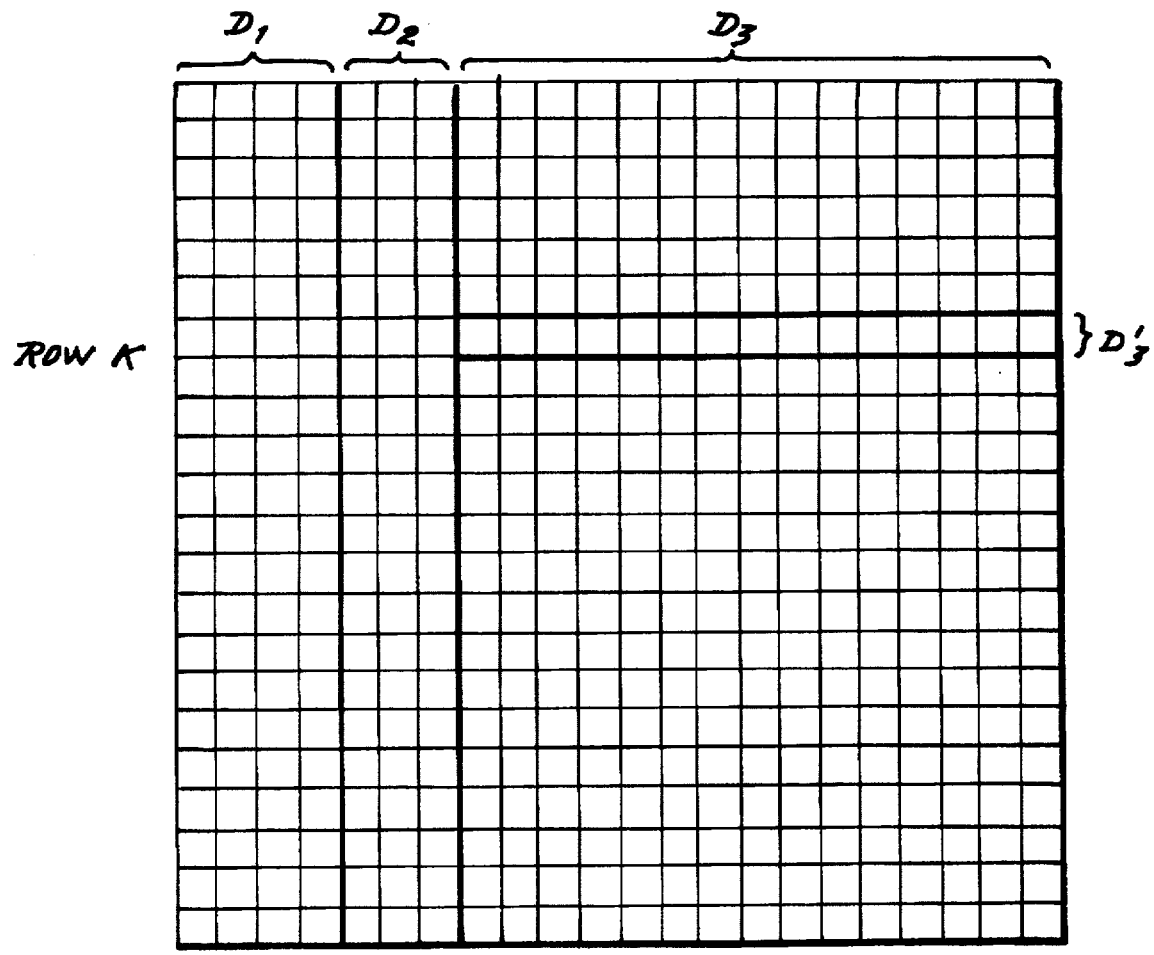
FIG. 4 is a pictorial representation of a detection array configuration as used in the invention; and, FIG. 5 is an expanded block diagram of the terminal warning system of the invention.

All of the detector arrays shown in FIG. 4 are adjacent on a single CCD chip. The CCD contains a rectangular array of m×n closely packed detectors. Normally the entire array is used to produce a visual image containing mm pixels (picture elements). For the scanning mode described above it is not intended to produce an image.

Instead various blocks of detectors are arbitrarily assigned different functions. Thus, three of four columns of detectors (area $D_1$ in FIG. 4) are used to perform the catalog/target acquisition function. Similarly, the detectors in the area $D_2$ will provide acquisition by observing target scintillation. The remaining detectors (i.e., those in area $D_3$) are used to monitor the intensity growth of the target signal to determine intercept time. For example, if detectors in row k from the sets $D_1$ or $D_2$ observe a target, the subset $D_3$ (row k of $D_3$) will monitor the target intensity.

Figure 5:
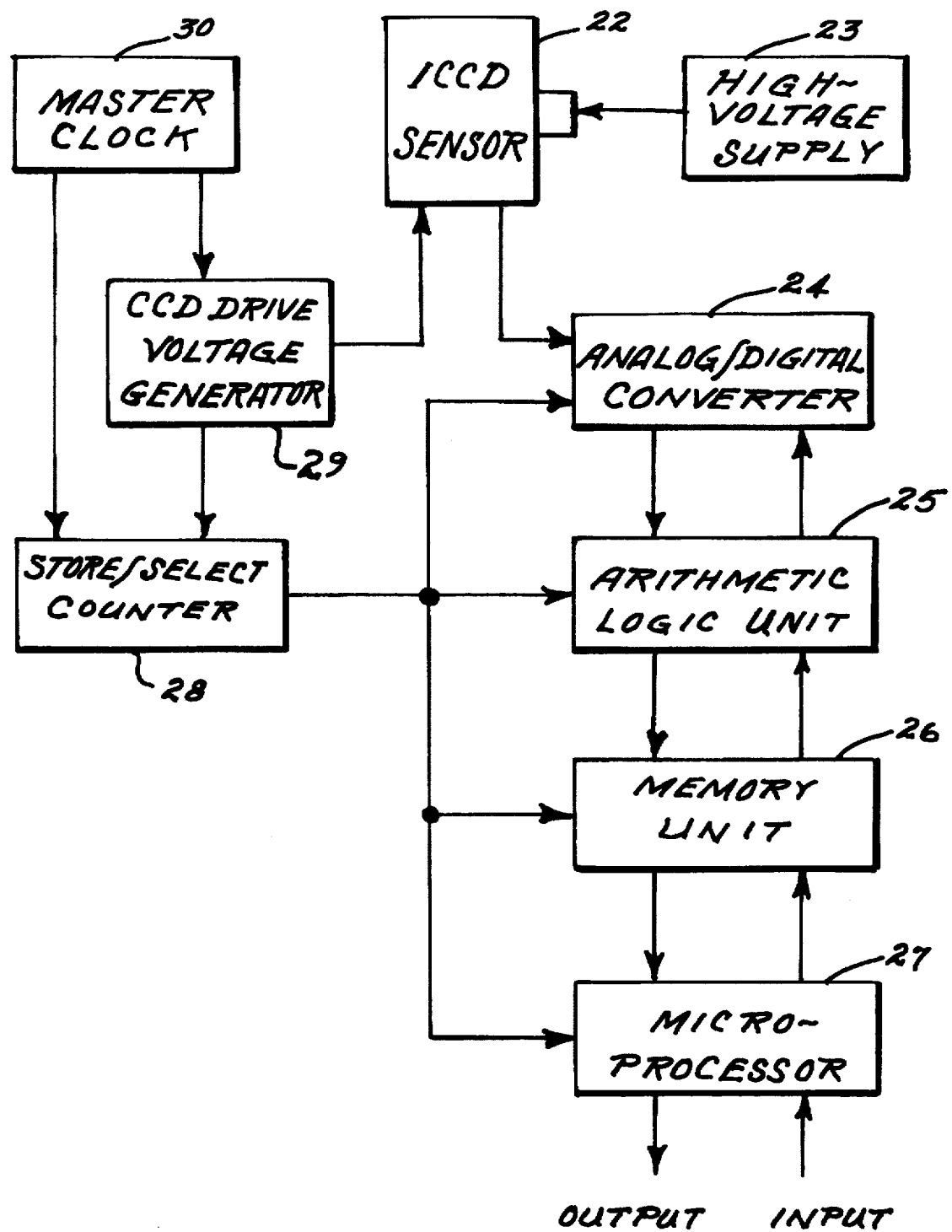

A more detailed block diagram of the terminal warning system of the invention is illustrated by FIG. 5. ICCD sensor 22 consists of an optical telescope plus a Digicon tube with a CCD detector at the focal plane. It has been described in detail with reference to FIG. 3. High voltage supply 23 provides 10–20 kilovolts (negative) to the Digicon photo cathode. Master clock 30 provides basic timing signals to synchronize all TWS operations. CCD drive voltage generator 29 provides requested voltage signals required to operate the CCD detector and store/select counter 28 gives signals to synchronize data processing units and CCD data readout. Analog-to-digital converter 24 digitizes analog signals from CCD. It may provide relatively coarse signal-intensity division during scan and acquisition phase and more fine single-intensity division during time-to-intercept determination phase. Arithmetic logic unit 25 provides initial processing in order to utilize data more effectively. For example, it can in conjunction with short term memory cumulatively add several frame sets of data to improve signal-to-noise ratio; it also can subtract alternate data set accumulations to suppress background signals. Memory unit 26 contains two memories, one a short-term memory, and the other a longer term memory. The short term memory contains essentially the data currently being provided by the ICCD sensor, as processed by the arithmetic logic unit. The longer term memory represents data accumulated at an earlier time and provides a stellar catalog against which the current data is compared. Micro-processor 27 carries out the various computations required by the TWS. These include correction of the data being entered into the short term memory for changes in the host-satellite attitude; search for foreign targets by comparison of data in the short term memory with data in the longer term memory; correlation of incoming data to eliminate false targets; and, determination of intercept time based upon growth of average target signal intensity.

The output from the TWS system includes information, such as: an alert in the event of a target detection; location of target; estimates of time-to-intercept; and health status of various TWS components.

The input to the TWS system includes information and commands, such as status of the host-satellite attitude; request for an on-orbit system test; and, request for review of stellar catalog in memory.

These inputs and outputs are conveyed between the TWS system and the satellite ground-support system via the satellite space-to-ground link subsystem.

Once a potential interceptor is detected at a given location within the surveillance field of view, its intensity (averaged over about a second) is measured by the array of detectors $D_3'$ (at right angles to $D_1$ and $D_2$) of FIG. 4 The array $D_3'$ is a subset of the rectangular array of detectors $D_3$.

The time-to-intercept can be determined from two or more measurements of the irradiance (1) from the approaching object. It is assumed that the interceptor's closing velocity (v) and radiance (L) are constant. Then $$I = L/R^2 \text{ and } R = v(T-t)$$

where R is the range of the object at time t, and T is the time at intercept. Combining the two formulas, the following is obtained:

$$\sqrt{I}\,(T-t) = \sqrt{L/v^2} = \text{constant}.$$

Thus, having two measurements $I_1$ and $I_2$, corresponding to times $t_1$ and $t_2$, the time at intercept is given by $$T = \left( \frac{\sqrt{I_2}\, t_2 - \sqrt{I_1}\, t_1}{\sqrt{I_2} - \sqrt{I_1}} \right)$$

Note that T is measured here on the same time scale as $t_1$ and $t_2$. The formula for T can be simplified by setting $t_1$ equal to zero when say $I_1$ can first be measured with reasonable accuracy. Then the time to intercept is $$T = \frac{t_2}{1 - \sqrt{I_1/I_2}}$$

Thus, T can be determined from the ratio of two irradiance measurements, even if the closing velocity, radiance, and range of the interceptor are not known. As an example, if $I_2 = 4I_1$, then $T = 2t_2$; that is, if $t_2$ is the time interval during which the intensity quadruples, an additional equal interval of time will elapse before intercept occurs. Likewise, the time for the intensity to double is about 0.3 the total time-to-intercept following the measurement $I_1$.

The formulas above assume a constant velocity and constant radiance for the interceptor. For most intercept modes, the velocity of the interceptor will vary very little over the last few thousand miles of its trajectory. The interceptor is usually in free flight over most of this range and the velocity change is less than a percent or two. Thrusting for terminal-error correction will usually involve only small changes in velocity direction, and may occur only within the last hundred miles or so.

Glints or scintillations result from specular reflections off flat or slightly curved vehicle surfaces. Their duration can extend from $\sim 10^{-4}$ sec to 1 sec or more. These glints, if they occur, will be much more intense than diffuse reflection. There is no directly correlatable correspondence between the duration of a glint signal and its period, assuming the glint is periodic because of interceptor roll or tumble motion. However, short glint durations would normally be associated with short intervals for observing successive glints.

In the foregoing disclosure the TWS was presumed to operate in an autonomous mode and survey a large field of view. In an alternative embodiment information may be available from other surveillance systems indicating the approximate direction in which a target may appear. In this hand-off mode of operation the field of view of the TWS can be restricted to a smaller region of space and the range at which a target is detected can be increased. It is also feasible to configure a TWS system so that it may operate alternatively in either a large field of view autonomous mode or in a small field of view hand-off mode.

While the invention has been described in one presently preferred embodiment, it is understood that the words which have been used are words of description rather than words of limitation and that changes within the purview of the appended claims may be made without departing from the scope and spirit of the invention in its broader aspects.

What is claimed is:

1. A satellite terminal warning system comprising a light source detecting means for detecting and monitoring, within an extended field of view, the positions and intensities of discrete stellar and non-stellar light sources that exceed a given light intensity threshold, a computer means having a short term memory and a long term memory, a catalog of all stellar light sources within said field of view having intensities equal to and greater than said light intensity threshold being registered by their coordinates in said long term memory, means for registering in said short term memory stellar and non-stellar light source position and intensity data from said light source detecting means, and a micro-processor for correlating the stellar and non-stellar light source data of said short and long term memories and for generating identification, position and rate of approach signals in response to detected non-stellar light sources and stellar and non-stellar light source intensity changes.

2. A satellite terminal warning system as defined in claim 1 including means for adjusting said catalog of stellar light sources to compensate for time induced changes in visual stellar background.

3. A satellite terminal warning system as defined in claim 2 including means for detecting and recording specular glints for correlation with recorded and catalogued stellar and non-stellar light source data.

4. A satellite terminal warning system as defined in claim 3 wherein said light source detecting means comprises a light collecting optical system, a two-dimensional array of charge coupled device sensing elements, and a Digicon tube arranged to focus accelerated photoelectrons on said array of sensing elements in response to light from said optical system.

5. A satellite terminal warning system as defined in claim 3 wherein said light source detecting means comprises a light collecting optical system in combination with an array of silicon photodiodes.

6. A satellite terminal warning system as defined in claim 3 wherein said light source detecting means comprises a light collecting optical system in combination with a scanning photo-multiplier.

* * * * *